United States Patent
Jariwala et al.

(10) Patent No.: US 10,093,822 B2
(45) Date of Patent: Oct. 9, 2018

(54) AMPHIPHILIC POLYMERS, COATING COMPOSITIONS, AND METHODS

(71) Applicant: 3M INNOVATIVE PROPERTIES COMPANY, St. Paul, MN (US)

(72) Inventors: Chetan P. Jariwala, Woodbury, MN (US); Susannah C. Clear, Hastings, MN (US); Ruchi Pandey, Bangalore (IN)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 47 days.

(21) Appl. No.: 15/502,622

(22) PCT Filed: Aug. 6, 2015

(86) PCT No.: PCT/US2015/043902
§ 371 (c)(1),
(2) Date: Feb. 8, 2017

(87) PCT Pub. No.: WO2016/028499
PCT Pub. Date: Feb. 25, 2016

(65) Prior Publication Data
US 2017/0226372 A1    Aug. 10, 2017

(30) Foreign Application Priority Data
Aug. 19, 2014   (IN) .......................... 4038/CHE/2014

(51) Int. Cl.
    C09D 133/16    (2006.01)
    C08F 220/28    (2006.01)
    C08L 33/16     (2006.01)
(52) U.S. Cl.
    CPC .......... *C09D 133/16* (2013.01); *C08F 220/28* (2013.01); *C08L 33/16* (2013.01); *C08F 2220/281* (2013.01); *C08L 2201/54* (2013.01)

(58) Field of Classification Search
    CPC .............. C09D 133/16; C08F 220/28; C08F 2220/281; C08L 33/16; C08L 2201/54
    (Continued)

(56) References Cited

U.S. PATENT DOCUMENTS

| | | | |
|---|---|---|---|
| 2,803,615 A | 8/1957 | Ahlbrecht | |
| 6,995,222 B2 * | 2/2006 | Buckanin | C09D 133/16 525/374 |

(Continued)

FOREIGN PATENT DOCUMENTS

| | | |
|---|---|---|
| EP | 2444428 | 4/2012 |
| EP | 2752435 | 7/2014 |

(Continued)

OTHER PUBLICATIONS

International Search Report for PCT International Application No. PCT/US2015/043902, dated Oct. 29, 2015, 4 pages.

*Primary Examiner* — Michael M Bernshteyn

(57) ABSTRACT

An amphiphilic polymer comprising: at least 10 wt-% monomeric units comprising alkylene oxide moieties, wherein a majority of the alkylene oxide moieties are ethylene oxide moieties; monomeric units comprising hexafluoropropylene oxide oligomeric moieties having the formula $C_3F_7O-(CF(CF_3)CF_2O)_aCF(CF_3)-C(O)N(H)-Q-$, wherein Q is a linking group with at least one carbon atom, and "a" is at least 5; and monomeric units comprising pendant groups selected from phosphate groups, phosphonate groups, sulfonate groups, and combinations thereof; wherein the amphiphilic polymer is water dispersible; aqueous coating compositions containing the amphiphilic polymer; and methods of treating a hard surface.

20 Claims, 5 Drawing Sheets

Coated Baffle and washed

(58) Field of Classification Search
USPC .......................................................... 524/544
See application file for complete search history.

(56) References Cited

U.S. PATENT DOCUMENTS

| | | | |
|---|---|---|---|
| 8,080,170 B2 | 12/2011 | Dams | |
| 8,945,712 B2 | 2/2015 | Dams | |
| 9,377,563 B2 * | 6/2016 | Hao | C08G 65/007 |
| 9,441,135 B2 * | 9/2016 | Klun | C09D 4/00 |
| 2005/0048288 A1 | 3/2005 | Flynn | |
| 2005/0137355 A1 * | 6/2005 | Buckanin | C09D 133/16 |
| | | | 525/374 |
| 2014/0094580 A1 * | 4/2014 | Hao | C08G 65/007 |
| | | | 526/247 |
| 2014/0228450 A1 * | 8/2014 | Ishiwata | A61Q 1/00 |
| | | | 514/772.4 |
| 2015/0126654 A1 * | 5/2015 | Klun | C09D 4/00 |
| | | | 524/265 |

FOREIGN PATENT DOCUMENTS

| | | |
|---|---|---|
| JP | 2013-124280 | 6/2013 |
| WO | WO 2005-061638 | 7/2005 |
| WO | WO 2005-090423 | 9/2005 |
| WO | WO 2009-076389 | 6/2009 |
| WO | WO 2012-061021 | 5/2012 |
| WO | WO 2013-031594 | 3/2013 |
| WO | WO 2013-191861 | 12/2013 |

* cited by examiner

Coated Baffle and washed

Uncoated Baffle, washed

Untreated after wash

Treated after cleaning with water

Treated challenged with oil

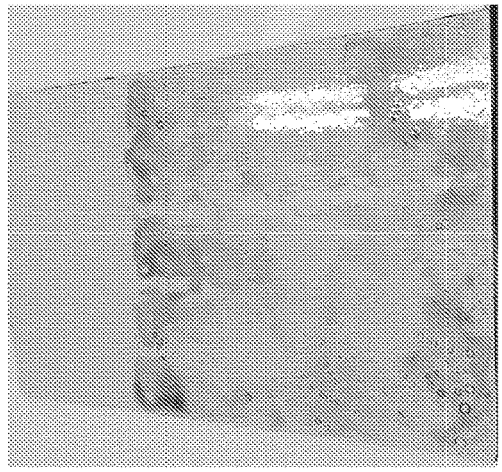
FIG. 3C Untreated after wash
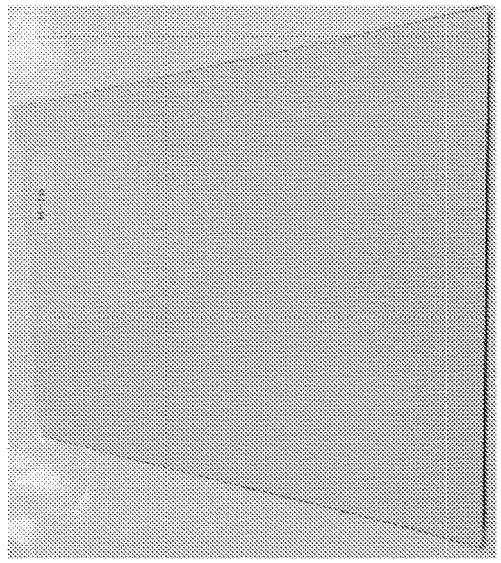
FIG. 3B Treated after cleaning with water
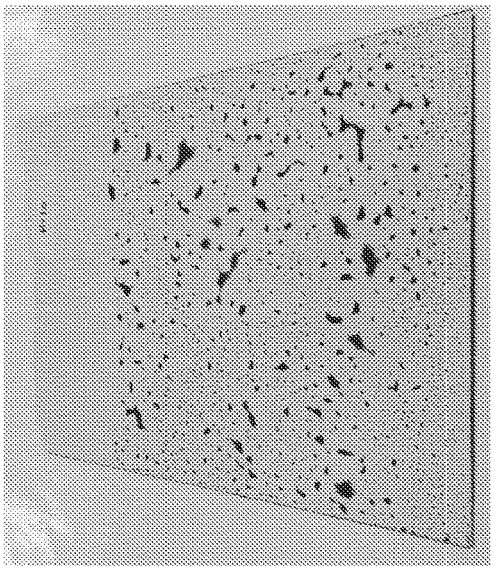
FIG. 3A Treated challenged with oil Untreated Treated Untreated Treated Untreated Untreated Treated Treated

AMPHIPHILIC POLYMERS, COATING COMPOSITIONS, AND METHODS

BACKGROUND

While there are many coating product formulations that serve the purpose of easy cleanability for surfaces of various kinds, there are few that have the potential to protect from the deposition of oil and dirt (i.e., grime) and yet allow easy removability of the coating when eventually necessary. Surfaces, such as those in a kitchen, e.g., exhaust and hood fans, plates, trays, etc., are exposed to oil, and attract dirt to form a thick and difficult-to-clean grime. Except for the use of harsh cleaning products and significant cleaning time, there are few products to address this problem. Because such surfaces are difficult to clean, they may not get cleaned during their entire life cycle, resulting in premature failure.

SUMMARY

The present disclosure provides an amphiphilic polymer and aqueous coating composition (e.g., aqueous dispersion) containing such polymer that can prevent the surfaces to which they are applied from getting oily. As a result, the surfaces attract less dirt than control or non-coated surfaces. Furthermore, when dirt does collect, such coated surfaces can be more easily cleaned (e.g., using a simple wet cloth, water wash, or water dipping depending upon the harshness of the grime).

In one embodiment, the present disclosure provides an amphiphilic polymer including: at least 10 wt-% (i.e., weight percent) monomeric units comprising alkylene oxide moieties, wherein a majority of the alkylene oxide moieties are ethylene oxide moieties; monomeric units comprising hexafluoropropylene oxide oligomeric moieties having the formula $C_3F_7O—(CF(CF_3)CF_2O)_aCF(CF_3)—C(O)N(H)-Q-$, wherein Q is a linking group with at least one carbon atom (e.g., $—C_2H_4—$, $—C_3H_6—$, $—C_4H_8—$, phenyl, benzyl, cyclohexyl) and "a" is at least 5; and monomeric units comprising pendant groups selected from phosphate groups, phosphonate groups, sulfonate groups, and combinations thereof; wherein the amphiphilic polymer is water dispersible. In certain embodiments, the amphiphilic polymer is one that is "self water dispersible."

In one embodiment, the present disclosure provides an aqueous dispersion including the amphiphilic polymer as described herein. In one embodiment, the present disclosure provides a method of treating a hard surface (e.g., a metal such as stainless steel or aluminum, a ceramic, wood, wood laminate, polyurethane-coated wood or glass) by applying such aqueous dispersion to a hard surface to form an easy clean coating.

In one embodiment, the present disclosure provides a method of treating a hard surface, wherein the method includes: providing a coating composition that includes: water; and an amphiphilic polymer including: at least 10 wt-% monomeric units comprising alkylene oxide moieties, wherein a majority of the alkylene oxide moieties are ethylene oxide moieties; monomeric units comprising hexafluoropropylene oxide oligomeric moieties having the formula $C_3F_7O—(CF(CF_3)CF_2O)_aCF(CF_3)—C(O)N(H)-Q-$, wherein Q is a linking group with at least one carbon atom (e.g., $—C_2H_4—$, $—C_3H_6—$, $—C_4H_8—$, phenyl, benzyl, cyclohexyl) and "a" is at least 5; and monomeric units comprising pendant groups selected from phosphate groups, phosphonate groups, sulfonate groups, and combinations thereof; and applying the coating composition to the hard surface to form an easy clean coating. This method is particularly useful on hard surfaces in a kitchen.

The following definitions are used herein:

A "self water dispersible" polymer is one that shows no visible separation of the polymer from water at 0.1 wt-% to 40 wt-% concentration, without the aid of added surfactants, co-solvents, or alkaline materials, at room temperature.

A "stable" aqueous dispersion is one that shows no visible separation of the polymer from water at 0.1 wt-% to 40 wt-% concentration for at least one month at room temperature.

The phrase "easy clean" in the context of a coating is one that, when subjected to the Oil Removal Test A or B of the Examples Section, the oil is visually all removed The term "polymer" includes, but is not limited to, homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

The term "alkyl" refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl group contains 1 to 20 carbon atoms, 1 to 10 carbon atoms, 1 to 6 carbon atoms, 1 to 4 carbon atoms, or 1 to 3 carbon atoms. Examples of alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene oxide" refers to a divalent group that is an oxy group bonded directly to an alkylene group. The term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Examples of alkylene groups include, but are not limited to, methylene, ethylene, 1,3-propylene, 1,2-propylene, 1,4-butylene, 1,4-cyclohexylene, and 1,4-cyclohexyldimethylene.

The terms "comprises" and variations thereof do not have a limiting meaning where these terms appear in the description and claims.

The terms "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

The terms "a," "an," and "the" are not intended to refer to only a singular entity, but include the general class of which a specific example may be used for illustration. The terms "a," "an," and "the" are used interchangeably with the term at least one. The phrases "at least one of" and "comprises at least one of" followed by a list refers to any one of the items in the list and any combination of two or more items in the list.

The term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein, in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.). And, the phrase "up to" a particular number includes that number (e.g., "up to 80 wt-%" includes 80 wt-%).

As used herein, the term "room temperature" refers to a temperature of 20° C. to 25° C. or 22° C. to 25° C.

Reference throughout this specification to "one embodiment," "an embodiment," "certain embodiments," or "some embodiments," etc. means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

FIG. 2A is a photograph of the treated glass surface challenged with oil, FIG. 2B is a photograph of the oil-challenged treated glass surface after being cleaned.

FIG. 3A and FIG. 3B are photographs of a melamine laminated wood surface treated with a coating composition of the present disclosure, compared to FIG. 3C, which is a photograph of an untreated melamine laminated wood surface. The melamine laminated wood surfaces shown in FIG. 3B and FIG. 3C were challenged with vegetable oil and cleaned. FIG. 3A is a photograph of the treated surface challenged with oil, FIG. 3B is a photograph of the oil-challenged treated surface after being cleaned, and FIG. 3C is a photograph of the untreated surface after being cleaned.

FIG. 4A and FIG. 4B show the untreated and treated tiles, respectively, challenged with oil, before cleaning.

FIG. 6A and FIG. 6B show the untreated and treated wood, respectively, challenged with oil, before cleaning.

DETAILED DESCRIPTION OF EXEMPLARY EMBODIMENTS

Figure 1A:
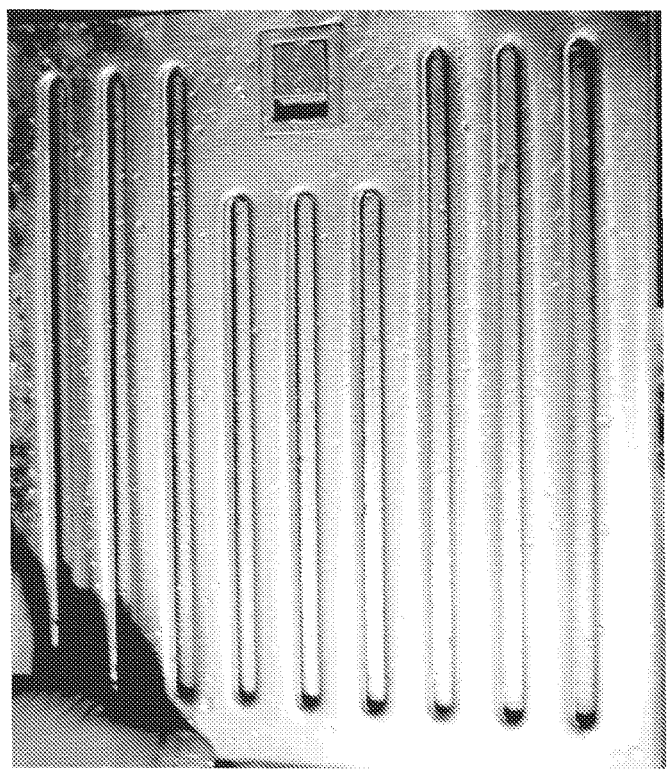
FIG. 1A is a photograph of a stainless steel baffle treated with a coating composition of the present disclosure, compared to FIG. 1B, which is a photograph of an untreated stainless steel baffle, both of which were subjected to real life cooking conditions, and cleaned.

The present disclosure provides an amphiphilic polymer and a coating composition that carries multiple advantages for providing easy-to-clean surfaces. The amphiphilic polymer and coating composition are best suited for surfaces subjected to extremely harsh conditions, for example, the oil and dirt (i.e., the combination of which forms grime) deposited on kitchen surfaces and which cannot be cleaned (easily) by available cleaning solutions (mostly based on surfactants). Kitchen surfaces can be made, for example, of ceramic tiles or metals (e.g., aluminum or stainless steel). Such kitchen surfaces include, for example, exhaust fans and other exhaust hood components.

More specifically, the present disclosure provides an amphiphilic polymer and a coating composition (typically, an aqueous dispersion) that can prevent the surfaces to which they are applied from getting oily. As a result, the surfaces attract less dirt than control or non-coated surfaces. Furthermore, when dirt does collect, such coated surfaces can be more easily cleaned (e.g., using a simple wet cloth, water wash, or water dipping depending upon the harshness of the grime).

In certain embodiments of the present disclosure, the amphiphilic polymer includes: at least 10 wt-% monomeric units comprising alkylene oxide moieties, wherein a majority of the alkylene oxide moieties are ethylene oxide moieties; monomeric units comprising hexafluoropropylene oxide oligomeric moieties having the formula $C_3F_7O$—$(CF(CF_3)CF_2O)_a CF(CF_3)$—$C(O)N(H)$-Q-, wherein Q is a linking group with at least one carbon atom (e.g., —$C_2H_4$—, —$C_3H_6$—, —$C_4H_8$—, phenyl, benzyl, cyclohexyl) and "a" is at least 5, and often up to 15; and monomeric units comprising pendant groups selected from phosphate groups, phosphonate groups, sulfonate groups, and combinations thereof; wherein the amphiphilic polymer is water dispersible. In certain embodiments, the amphiphilic polymer is one that is self water dispersible.

The amphiphilic polymer comprises at least 3 monomeric units, one being hydrophilic, one being oleophobic and one being an anchoring group for the substrate. In one embodiment the amphiphilic polymer monomers include an alcohol of "HFPO-Amide" moiety esterified to form a methacrylate (oleophobic), a polyethyleneglycol moiety esterified to methacrylic acid (hydrophilic), and an ethyleneglycol methacrylate phosphate (for anchoring to a substrate surface).

An amphiphilic polymer of the present disclosure may include block or random orientation of the monomeric units.

Typically, the polymer includes a random orientation of the at least three (and preferably, three) different types of monomeric units.

In certain embodiments of the present disclosure, the amphiphilic polymer of the present disclosure is incorporated in a coating composition, particularly an aqueous dispersion. Such coating composition (e.g., aqueous dispersion) can be applied to a hard surface (such as those in a kitchen) to form an easy clean coating.

In one embodiment, the present disclosure provides a method of treating a hard surface, wherein the method includes: providing a coating composition that includes: water; and an amphiphilic polymer including: at least 10 wt-% monomeric units comprising alkylene oxide moieties, wherein a majority of the alkylene oxide moieties are ethylene oxide moieties; monomeric units comprising hexafluoropropylene oxide oligomeric moieties having the formula $C_3F_7O-(CF(CF_3)CF_2O)_aCF(CF_3)-C(O)N(H)$-Q-, wherein Q is a linking group with at least one carbon atom (e.g., $-C_2H_4-$, $-C_3H_6-$, $-C_4H_8-$, phenyl, benzyl, cyclohexyl) and "a" is at least 5, and often up to 15; and monomeric units comprising pendant groups selected from phosphate groups, phosphonate groups, sulfonate groups, and combinations thereof; and applying the coating composition to the hard surface to form an easy clean coating.

Amphiphilic Polymers

An amphiphilic polymer includes both hydrophilic and oleophobic moieties. An amphiphilic polymer of the present disclosure includes monomeric units that include alkylene oxide moieties, monomeric units that include hexafluoropropylene oxide oligomeric moieties, and monomeric units that include pendant groups selected from phosphate groups, phosphonate groups, sulfonate groups, and combinations thereof.

In certain embodiments, the amphiphilic polymer is water dispersible (i.e., one that shows no visible separation of the polymer from water at 0.1 wt-% to 40 wt-% concentration). In certain embodiments, the amphiphilic polymer is "self water dispersible." By this it is meant that the amphiphilic polymer is one that shows no visible separation of the polymer from water at 0.1 wt-% to 40 wt-% concentration, without the aid of added surfactants, co-solvents, or alkaline materials, at room temperature.

In certain embodiments, an amphiphilic polymer of the present disclosure in water forms an aqueous dispersion. In certain embodiments, such aqueous dispersion is stable for at least one month in water at 0.1 wt-% concentration at room temperature.

The monomeric units are typically derived from ethylenically unsaturated monomers. In certain embodiments, the monomeric units are (meth)acrylate-containing units. That is, the monomeric units of the polymer are derived from (meth)acrylate monomers (i.e., methacrylate monomers and acrylate monomers).

In certain embodiments, a majority (i.e., greater than 50% by weight) of the alkylene oxide moieties are ethylene oxide moieties. Typically, all of the alkylene oxide moieties are ethylene oxide moieties.

In certain embodiments, at least 10 weight percent (wt-%), or at least 20 wt-%, or at least 30 wt-%, or at least 40 wt-%, of the monomeric units of the amphiphilic polymer include alkylene oxide moieties. In certain embodiments, up to 60 wt-%, or up to 70 wt-%, or up to 80 wt-%, of the monomeric units of the amphiphilic polymer are those that include alkylene oxide moieties.

In certain embodiments, the monomeric units that include alkylene oxide moieties may also include free hydroxyl groups, alkyl-capped hydroxyl groups, or combinations thereof.

Examples of alkylene oxide-containing monomers are (meth)acrylate monomers (i.e., acrylate and methacrylate monomers) including 2-(ethoxy) ethoxy ethyl acrylate, methyl ether capped polyethyleneglycol methylethyl methacrylate (e.g., of molecular weight 1100, commercially available from Sigma-Aldrich, St. Louis, Mo.), methyl ether capped polyethyleneglycol methacrylate (e.g., of molecular weight 500, commercially available from Sigma-Aldrich, St. Louis, Mo.), methyl ether capped polyethyleneglycol acrylate (e.g., of molecular weight 480, commercially available from Sigma-Aldrich, St. Louis, Mo.), methyl ether capped polyethyleneglycol methylacrylate (e.g., of molecular weight 1100, commercially available from Sigma-Aldrich, St. Louis, Mo.), free hydroxyl (uncapped) polyethyleneglycol methylacrylate (e.g., of molecular weight 526, commercially available from Sigma-Aldrich, St. Louis, Mo.), methyl ether capped polyethyleneglycol methylacrylate (e.g., of molecular weight 360, commercially available from Sigma-Aldrich, St. Louis, Mo.). Other examples include $CH_2=CHC(O)-(OC_3H_6)_n-OH$, $CH_2=CMeC(O)-(OC_3H_6)_n-OH$, $CH_2=CHC(O)-(OC_4H_8)_n-OH$, and $CH_2=CMeC(O)-(OC_4H_8)_n-OH$, wherein n is at least 4 for each of these examples. Still others include hydroxyl- or methyl ether-capped EO-PO-(meth)acrylates. Herein, such molecular weights are number average molecular weights. Various combinations of such monomers can be used in making the amphiphilic polymers of the present disclosure.

In certain embodiments, at least 10 wt-%, or at least 20 wt-%, or at least 30 wt-%, of the monomeric units of the amphiphilic polymer include hexafluoropropylene oxide oligomeric moieties having the formula $C_3F_7O-(CF(CF_3)CF_2O)_aCF(CF_3)-C(O)N(H)$-Q-, wherein Q is a linking group with at least one carbon atom (e.g., $-C_2H_4-$, $-C_3H_6-$, $-C_4H_8-$, phenyl, benzyl, cyclohexyl) and "a" is at least 5, and often up to 15. In certain embodiments, up to 50 wt-%, or up to 60 wt-%, or up to 70 wt-%, of the monomeric units of the amphiphilic polymer are those that include hexafluoropropylene oxide oligomeric moieties having the formula $C_3F_7O-(CF(CF_3)CF_2O)_aCF(CF_3)-C(O)N(H)$-Q-, wherein Q is a linking group with at least one carbon atom (e.g., $-C_2H_4-$, $-C_3H_6-$, $-C_4H_8-$, phenyl, benzyl, cyclohexyl) and "a" is at least 5, and often up to 15.

Hexafluoropropylene oxide oligomeric moieties are made from HFPO-Amide-containing monomers. Unless otherwise noted, "HFPO-Amide" refers to the group $C_3F_7O-(CF(CF_3)CF_2O)_aCF(CF_3)-C(O)N(H)$-Q-. In this group, "a" is at least 5. In some embodiments "a" is up to 15. In some embodiments, "a" is 5 to 10, or in some embodiments, "a" is 5 to 8. Such species generally exist as a distribution or mixture of oligomers with a range of values for "a", so that the value of "a" may be an average, and thus, a non-integer. In this group, Q is a linking group with at least one carbon atom (e.g., $-C_2H_4-$, $-C_3H_6-$, $-C_4H_8-$, phenyl, benzyl, cyclohexyl).

Examples of hexafluoropropylene oxide oligomeric monomers that include moieties having the formula $C_3F_7O-(CF(CF_3)CF_2O)_aCF(CF_3)-C(O)N(H)$-Q-
include: a hexafluoropropyleneoxideoligomer-methacrylate of the formula $C_3F_7O-[CF(CF_3)CF_2O]_{6.3}CF(CF_3)C(O)N(H)CH_2CH_2OC(O)C(CH_3)=CH_2$ (which is a methacrylic acid ester of an oligomeric hexafluoropropylene oxide amide alcohol made as described in Preparative Example 3 of U.S.

Pat. Pub. No. 2005/0137355), a hexafluoropropyleneoxideoligomer-phosphate of the formula $C_3F_7O—[CF(CF_3)CF_2O]_aCF(CF_3)C(O)N(H)CH_2CH_2OP(O)(OH)_2$ (a=3-10) (which can be prepared as described in U.S. Pat. Pub. No. 2005/0048288, Example 1), and a methyl ether capped polyethyleneglycol methacrylate of number average molecular weight 500. Various combinations of such monomers can be used in making the amphiphilic polymers of the present disclosure.

In certain embodiments, at least 1 wt-%, or at least 5 wt-%, or at least 7 wt-%, of the monomeric units of the amphiphilic polymer include pendant groups selected from phosphate groups, phosphonate groups, sulfonate groups, and combinations thereof. In certain embodiments, up to 10 wt-%, or up to 12 wt-%, or up to 15 wt-%, of the monomeric units of the amphiphilic polymer are those that include pendant groups selected from phosphate groups, phosphonate groups, sulfonate groups, and combinations thereof.

In certain embodiments, the pendant groups of the amphiphilic polymer are in the acid form.

Examples of monomers that include pendant groups selected from phosphate groups, phosphonate groups, sulfonate groups, and combinations thereof include: pendant phosphate-containing monomers such as phosphate methacrylate monomer, ethyleneglycol methacrylate phosphate, HEMA-phosphate; pendant phosphonate-containing monomers such as vinyl phosphonic acid; and pendant sulfonate-containing monomers such as 2-acrylamido-2-methyl-1-propanesulfonic acid. Various combinations of such monomers can be used in making the amphiphilic polymers of the present disclosure.

In certain embodiments, in addition to these three types of monomers (i.e., the alkylene oxide-containing monomers, the hexafluoropropylene oxide oligomeric monomers, and the monomers that include pendant groups selected from phosphate groups, phosphonate groups, sulfonate groups, and combinations thereof), various other monomers can be used in making the amphiphilic polymers of the present disclosure. If used, such "other" monomeric units may be present in relatively small amounts (e.g., less than 5 wt-%) in amphiphilic polymers of the present disclosure. Examples of such monomers other than the alkylene oxide-containing monomers, the hexafluoropropylene oxide oligomeric monomers, and the monomers that include pendant groups selected from phosphate groups, phosphonate groups, sulfonate groups, and combinations thereof, include, for example, (meth)acrylic acid and methylmethacrylate.

In certain embodiments, the amphiphilic polymer of the present disclosure further includes monomeric units that include pendant carboxylic acid groups. If used, examples of monomers that include carboxylic acid groups include acrylic acid, $CH_2=C(R)—COO—C_2H_4OCOC_2H_4COOH$ where R=H or $CH_3$.

In certain embodiments, the amphiphilic polymer of the present disclosure includes 0 to less than 2 wt-% alkoxy silane groups. In certain embodiments, the amphiphilic polymer of the present disclosure does not include alkoxy silane groups. In this context, "alkoxy silane" groups refer to the group $—Si(OR)_3$, wherein R is independently hydrogen or an alkyl group having 1 to 4 carbon atoms. If used, examples of monomers that include alkoxy silane groups include 3-(trimethoxysilyl)propylmethacrylate.

Amphiphilic polymers described herein may be prepared, for example, by reacting a mixture containing at least the three types of monomers (i.e., the alkylene oxide-containing monomers, the hexafluoropropylene oxide oligomeric monomers, and the monomers that include pendant groups selected from phosphate groups, phosphonate groups, sulfonate groups, and combinations thereof) typically in the presence of a chain transfer agent and an initiator (i.e., catalyst). By the term "reacting" it is meant forming a composition that includes at least one identifiable structural element due to each of the three monomeric units. Depending on the stoichiometry of the reaction, an oligomer or polymer may be formed. Typically, the polymer or oligomer has a distribution of molecular weights and compositions.

Polymerization conditions can be readily determined by one of skill in the art. For example, the polymerization can be carried out at a wide variety of temperatures suitable for conducting an organic free-radical reaction. Temperature and solvent for a particular use can be selected by those skilled in the art based on considerations such as the solubility of reagents, temperature required for the use of a particular initiator, and desired molecular weight. While it is not practical to enumerate a particular temperature suitable for all initiators and all solvents, generally suitable temperatures are in a range of 30° C. to 200° C.

Free-radical polymerizations may be carried out in the presence of chain transfer agents. Typical chain transfer agents that may be used in the preparation of compositions described herein include hydroxyl-substituted mercaptans (e.g., 2-mercaptoethanol, 3-mercapto-2-butanol, 3-mercapto-2-propanol, 3-mercapto-1-propanol, and 3-mercapto-1,2-propanediol (i.e., thioglycerol)); amino-substituted mercaptans (e.g., 2-mercaptoethylamine); difunctional mercaptans (e.g., di(2-mercaptoethyl)sulfide); and aliphatic mercaptans (e.g., octylmercaptan, dodecylmercaptan, and octadecylmercaptan). Others include methylmercaptopropionate and mercaptopropionic acid.

Free-radical polymerizations may be carried out in the presence of initiators (i.e., catalysts). Typical initiators that may be used in the preparation of compositions described herein include radical-generating initiators including peroxide-based initiators. An example includes 2,2'-azobis(2-methylbutyronitrile) commercially available from DuPont, Wilmington, Del. under the trade designation "VAZO 67."

In certain embodiments, the reaction is carried out in one or more organic solvents. The components may be present in the reaction medium at any suitable concentration (e.g., from 5 percent to 80 percent by weight based on the total weight of the reaction mixture). Illustrative examples of suitable solvents include ethers (e.g., diethyl ether, glyme, diglyme, and diisopropyl ether), esters (e.g., ethyl acetate and butyl acetate), alcohols (e.g., ethanol and isopropyl alcohol), ketones (e.g., acetone, methyl ethyl ketone and methyl isobutyl ketone), halogenated solvents (e.g., methylchloroform, 1,1,2-trichloro-1,2,2-trifluoroethane, trichloroethylene, and trifluorotoluene), and mixtures thereof.

Coating Compositions

The present disclosure provides a coating composition that can be used in a method of treating a hard surface to provide an easy-clean surface. The hard surface can include metal (e.g., stainless steel or aluminum), wood, wood laminate, polyurethane-coated wood, glass, ceramic, or a combination thereof.

The coating composition is preferably an aqueous dispersion. The amphiphilic polymer of the coating composition can be present in an amount of at least 0.1 wt-%, based on the total weight of the coating composition. The amphiphilic polymer of the coating composition can be present in an amount of up to 1.0 wt-%, based on the total weight of the coating composition.

In certain embodiments, the coating composition includes water in an amount of at least 80 wt-%, based on the total weight of the coating composition. In certain embodiments, the coating composition includes water in an amount of no greater than 99.9 wt-%, based on the total weight of the coating composition.

In certain embodiments, the coating composition can be in a sprayable form. Alternatively, it can be used in a wipable or dippable form. Thus, it can be used either by a consumer or a manufacturer, on, for example, a stove-top surface.

In some cases, no organic solvent is used in the coating composition.

In certain embodiments, the coating composition can also include a water-miscible organic solvent. Examples of suitable water-miscible organic solvents include isopropanol, ethanol, methanol, n-butanol, dipropylene glycol monomethyl ether, dipropylene glycol, and combinations thereof. If used, the water-miscible organic solvent is typically present in an amount of at least 10 wt-%, based on the total weight of the coating composition. If used, the water-miscible organic solvent is typically present in an amount of no greater than 50 wt-%, based on the total weight of the coating composition.

In certain embodiments, the coating composition can also include one or more additives. Examples of suitable additives include fragrances, preservatives, pigments, stabilizers, anti-foaming agents, anti-soiling agents, and combinations thereof. If used, the amount of each of these additives is readily determined by one of skill in the art.

The coating composition can be applied using any of a variety of liquid coating techniques (e.g., spraying, dipping, painting, etc.). It can be simply dried at room temperature to remove at least a portion of the water or organic solvent that may be included. If desired, the coating composition can be heated, after coating, to a temperature above room temperature (e.g., 130° C.) for improved performance.

Illustrative Embodiments

Embodiment 1 is an amphiphilic polymer comprising (or consisting essentially of, or consisting of): at least 10 wt-% monomeric units comprising alkylene oxide moieties, wherein a majority of the alkylene oxide moieties are ethylene oxide moieties; monomeric units comprising hexafluoropropylene oxide oligomeric moieties; and monomeric units comprising pendant groups selected from phosphate groups, phosphonate groups, sulfonate groups, and combinations thereof; wherein the amphiphilic polymer is water dispersible.

Embodiment 2 is the amphiphilic polymer of embodiment 1 wherein the pendant groups are in the acid form.

Embodiment 3 is the amphiphilic polymer of embodiment 1 or 2 which forms a stable dispersion for at least one month in water at 0.1 wt-% concentration at room temperature.

Embodiment 4 is the amphiphilic polymer of any of embodiments 1 through 3 which includes 0 to less than 2 wt-% alkoxy silane groups.

Embodiment 5 is the amphiphilic polymer of embodiment 4 which does not include alkoxy silane groups.

Embodiment 6 is the amphiphilic polymer of any of embodiments 1 through 5 wherein the monomeric units are (meth)acrylate-containing units.

Embodiment 7 is the amphiphilic polymer of any of embodiments 1 through 6 further comprising monomeric units comprising pendant carboxylic acid groups.

Embodiment 8 is the amphiphilic polymer of any of embodiments 1 through 7 comprising 10-80 wt-% of the monomeric units comprising alkylene oxide moieties.

Embodiment 9 is the amphiphilic polymer of any of embodiments 1 through 8 comprising 10-60 wt-% of the monomeric units comprising hexafluoropropylene oxide oligomeric having the formula $C_3F_7O-(CF(CF_3)CF_2O)_aCF(CF_3)-C(O)N(H)-Q-$, wherein Q is a linking group with at least one carbon atom (e.g., $-C_2H_4-$, $-C_3H_6-$, $-C_4H_8-$, phenyl, benzyl, cyclohexyl) and "a" is at least 5.

Embodiment 10 is the amphiphilic polymer of any of embodiments 1 through 9 comprising 1-10 wt-% of the monomeric units comprising pendant groups selected from phosphate groups, phosphonate groups, sulfonate groups, and combinations thereof.

Embodiment 11 is the amphiphilic polymer of any of embodiments 1 through 10 wherein the monomeric units comprising alkylene oxide moieties comprise free hydroxyl groups, alkyl-capped hydroxyl groups, or combinations thereof.

Embodiment 12 is the amphiphilic polymer of any of embodiments 1 through 11 wherein "a" is up to 15 (or, 5 to 10, or 5 to 8).

Embodiment 13 is an aqueous dispersion comprising the amphiphilic polymer of any one of embodiments 1 through 12.

Embodiment 14 is a method of treating a hard surface, the method comprising: providing the aqueous dispersion of embodiment 13; and applying a coating composition comprising the aqueous dispersion to the hard surface to form an easy clean coating.

Embodiment 15 is a method of treating a hard surface, the method comprising: providing a coating composition comprising: water; and an amphiphilic polymer comprising: at least 10 wt-% monomeric units comprising alkylene oxide moieties, wherein a majority of the alkylene oxide moieties are ethylene oxide moieties; monomeric units comprising hexafluoropropylene oxide oligomeric moieties having the formula $C_3F_7O-(CF(CF_3)CF_2O)_aCF(CF_3)-C(O)N(H)-Q-$, wherein Q is a linking group with at least one carbon atom (e.g., $-C_2H_4-$, $-C_3H_6-$, $-C_4H_8-$, phenyl, benzyl, cyclohexyl) and "a" is at least 5; and monomeric units comprising pendant groups selected from phosphate groups, phosphonate groups, sulfonate groups, and combinations thereof; and applying the coating composition to the hard surface to form an easy clean coating.

Embodiment 16 is the method of embodiment 14 or 15 wherein the hard surface comprises metal, wood, wood laminate, polyurethane-coated wood, glass, ceramic, or a combination thereof.

Embodiment 17 is the method of any of embodiments 14 through 16 wherein the amphiphilic polymer of the coating composition is present in an amount of 0.1 wt-% to 1.0 wt-%, based on the total weight of the coating composition.

Embodiment 18 is the method of any of embodiments 14 through 17 wherein the coating composition further comprises one or more water-miscible organic solvents.

Embodiment 19 is the method of any of embodiments 14 through 18 wherein the amphiphilic polymer includes 0 to less than 2 wt-% alkoxy silane groups.

Embodiment 20 is the method of any of embodiments 15 through 19 wherein the monomeric units of the amphiphilic polymer are (meth)acrylate-containing units.

Embodiment 21 is the method of any of embodiments 15 through 20 wherein the amphiphilic polymer comprises (or consists essentially of, or consists of): 10-80 weight percent of the monomeric units comprising alkylene oxide moieties; 10-60 weight percent of the monomeric units comprising hexafluoropropylene oxide oligomeric moieties having the formula $C_3F_7O-(CF(CF_3)CF_2O)_aCF(CF_3)-C(O)N(H)-$ Q-, wherein Q is a linking group with at least one carbon atom (e.g., —$C_2H_4$—, —$C_3H_6$—, —$C_4H_8$—, phenyl, benzyl, cyclohexyl) and "a" is at least 5; and 1-10 weight percent of the monomeric units comprising pendant groups selected from phosphate groups, phosphonate groups, sulfonate groups, and combinations thereof.

Embodiment 22 is the method of any of embodiments 15 through 21 wherein "a" is up to 15 (or, 5 to 10, or 5 to 8).

Examples

Objects and advantages of this disclosure are further illustrated by the following examples, but the particular materials and amounts thereof recited in these examples, as well as other conditions and details, should not be construed to unduly limit this disclosure.

The following examples are merely for illustrative purposes and are not meant to limit in any way the scope of the appended claims. All parts, percentages, ratios, and the like in the examples are by weight, unless noted otherwise. Unit abbreviations used include min=minutes, h=hours, g=grams, wt=weight, cm=centimeter. Unless otherwise stated, materials were obtained from Sigma-Aldrich, Milwaukee, Wis.

Materials

PM1=A 50:50 mix of 2-(ethoxy) ethoxy ethyl acrylate monomer and phosphate methacrylate monomer commercially available from Sartomer, Exton, Pa. under the trade designation "CD9050."

PM2=Ethyleneglycol methacrylate phosphate or HEMA-Phosphate commercially available from ESSTECH, Inc. as HEMA-Phosphate Part No. X7440000.

PM3=Vinyl phosphonic acid commercially available from Sigma-Aldrich, St. Louis, Mo.

MMP (Chain transfer agent)=methylmercaptopropionate commercially available from Sigma-Aldrich, St. Louis, Mo.

V-67 (catalyst)=2,2'-Azobis(2-methylbutyronitrile) commercially available from DuPont, Wilmington, Del. under the trade designation "VAZO 67."

AA (Acrylic acid) commercially available from Sigma-Aldrich, St. Louis, Mo.

PEG1100MEM=methyl ether capped polyethyleneglycol methylethyl methacrylate having a number average molecular weight (MW) 1100, commercially available from Sigma-Aldrich, St. Louis, Mo.

PEG500MA=methyl ether capped polyethyleneglycol methacrylate, number average MW 500 commercially available from Sigma-Aldrich, St. Louis, Mo.

PEG480A=methyl ether capped polyethyleneglycol acrylate, number average MW 480 commercially available from Sigma-Aldrich, St. Louis, Mo.

PEG1100MA=methyl ether capped polyethyleneglycol methylacrylate, number average MW 1100 commercially available from Sigma-Aldrich, St. Louis, Mo.

PEG526MAU=Free hydroxyl (uncapped) polyethyleneglycol methylacrylate, number average MW 526 commercially available from Sigma-Aldrich, St. Louis, Mo.

PEG360MA=methyl ether capped polyethyleneglycol methylacrylate, number average MW 360 commercially available from Sigma-Aldrich, St. Louis, Mo.

TMSPMA=3-(trimethoxysilyl)propylmethacrylate commercially available from Sigma-Aldrich, St. Louis, Mo.

HFPO-Amide-MA=Hexafluoropropyleneoxide oligomer-methacrylate. $C_3F_7O$—[$CF(CF_3)CF_2O$]$_{6.3}CF(CF_3)C(O)N(H)CH_2CH_2OC(O)C(CH_3)$=$CH_2$; The methacrylate of an oligomeric hexafluoropropylene oxide amide alcohol made as described in Preparative Example 3 of U.S. Pat. Pub. No. 2005/0137355.

HFPO-Amide-Phosphate=$C_3F_7O$—[$CF(CF_3)CF_2O$]$_a$$CF(CF_3)C(O)N(H)CH_2CH_2OP(O)(OH)_2$ prepared as described in U.S. Pat. Pub. No. 2005/0048288 Example 1 where a=3-10.

HFPO-Amide-Quat Silane=a hexafluoropropylene oxide oligomer-quat silane of the formula $C_3F_7O$—($CF(CF_3)CF_2O$)$_a$$CF(CF_3)$—$C(O)N(H)$—$C_3H_6N(CH_3)_2^+(Cl^-)$$C_3H_6$—$Si$—$(OCH_3)_3$ prepared as per Example 1 of U.S. Pat. No. 8,080,170 wherein "a" is 6.3.

C4A=$C_4F_9SO_2N(CH_3)C_2H_4COO$—$CH$=$CH_2$ prepared as described in U.S. Pat. No. 2,803,615 Example 1 except N-propyl, N-ethanolperfluorooctanesulfonamide was replaced with N-Methyl, N-ethanol perfluorobutanesulfonamide.

C6A=FLUOWET AC600 commercially available from Clariant/Archroma, Reinach, Switzerland.

C4MA=$C_4F_9SO_2N(CH_3)C_2H_4COO$—$C(CH_3)$=$CH_2$ prepared as described in U.S. Pat. No. 2,803,615, Example 4, where N-butyl, N-butanol perfluorooctanesulfonamide was replaced by N-methyl, N-ethanol perfluorobutanesulfonamide.

ODMA=octadecylmethacrylate commercially available from Sigma-Aldrich, St. Louis, Mo.

ODM=$C_{18}H_{37}OCOC_2H_4SH$ commercially available from Sigma-Aldrich, St. Louis, Mo.

ODA=octadecyl acrylate commercially available from Sigma-Aldrich, St. Louis, Mo.

DDM=dodecylmercaptan commercially available from Sigma-Aldrich, St. Louis, Mo.

MMA=methylmethacrylate commercially available from Sigma-Aldrich, St. Louis, Mo.

AMPS=2-acrylamido-2-methyl-1-propanesulfonic acid from Sigma-Aldrich, St. Louis, Mo.

Generic Polymerization Procedure

The monomers and a blend of solvents (methyl isobutyl ketone (MIBK)/isopropanol (IPA) with the monomer amounts and solvent ratios shown in Table 1 (except for Comparative Example G which was water/IPA) were added to a 500 milliliter (500-mL) bottle and nitrogen was bubbled for 10 minutes (min). Then 0.5 grams (g) of "V-67" was added and the bottle sealed and heated at 70° C. for 15 hours (hrs). The resulting polymer was analyzed by IR, which showed the disappearance of >C=C< peaks indicating polymer formation (believed to be random polymers). The resulting polymer/solvent mix was observed and the observation recorded as "VS" for very soluble cold, "H" for hazy, "G" for gelled, "C" for clear, "2 layers," "P" for precipitate, "SM" for skim milk appearance and "V" for viscous. The polymer/solvent was heated to 50° C. for further observation and if the polymer/solvent had two layers, had gelled, or had precipitated, no attempt was made to add water to make a water dispersion, and no oil challenge testing was done. Otherwise a 100-gram portion of the above polymer/solvent solution and 200 g deionized water was added and either sonicated for 4 min or passed through a microfluidizer two times. The solvent in the resulting dispersion was removed by vacuum distillation using a rotoevaporator at 40° C. Appearance of the aqueous mix after solvent removal was recorded as "M" for microemulsion, "VM" for viscous microemulsion, "C" for clear, "AC" for almost clear, "H" for hazy or "2 layers."

Oil Removal Test A

This test was used for all examples in Table 1 and 2 (except those marked "NT"). Solutions (1 weight percent (wt-%) solids polymer) were coated onto a bare stainless steel panel (7.5 cm×7.5 cm (3 in×3 in)) using a pipette. The solution was allowed to sit on the panel for 5 minutes (min)

before the excess was wiped off using a paper towel. The panel was then allowed to dry at 20° C. for 1 hour (hr) before challenging with oil. The oil was prepared by mixing 1 g of "Oil Red O" (Alfa Aesar, Ward Hill, Mass.) and 99 g mineral oil/hexadecane (Aldrich, St. Louis, Mo.). The panel was then exposed to 3 drops of oil and rubbed to evenly coat the substrate (0.07 grams total for the 3 drops). After 5 min, the panel was rinsed under running 20° C. tap water (no cleaners or surfactants or abrasion of any kind were used) for 20 seconds (700 grams water used in 20 seconds). Oil removal results are recorded as "None" if visually the majority did not wash off or "All" if visually the oil completely washed off "Easy clean" is defined as having the "All" rating.

In one case (Example 1) the oil removal test was repeated two more times on the same panel after the first test by re-drying at 20° C. for 1 hr before challenging with the oil. The panel was then re-exposed to three drops of oil and rubbed to evenly coat the substrate. Then again after 5 min the panel was rinsed under running 20° C. tap water for 20 seconds. This was repeated once again for a total of three challenge/rinse cycles. This showed that the treatment was durable for 3 challenge/rinse cycles as indicated in Table 2.

Oil Removal Test B

This test was used for those described under "Additional Substrate Testing" not included in Tables 1 or 2. Solutions (0.5 wt-% solids polymer) were sprayed to completely cover the substrate and allowed to dry at 20° C. for 1 hr. The substrates included plain glass panels 2 inches (in)×5 in×⅛ in (5 centimeters (cm)×12.5×0.32 cm, commercially obtained from Cheminstruments, Fairfield, Ohio), white melamine wood laminate sheets (top layer only that is usually pressed onto wood, 6 in×12 in×0.028 in (15 cm×30 cm×0.07 cm, commercially obtained from CenturyPly, India), ceramic tile 30 cm×30 cm commercially obtained from Kahjaria tiles, New Delhi, India, and polyurethane coated wood 42.5 cm×12 cm (wood treated with "Asian Paints PU Interior" polyurethane (polyurethane from Asian Paints Limited, Mumbai, India).

Three drops (0.07 gram) of vegetable cooking oil (blend of 60% refined corn oil/40% refined rice bran oil sold under the brand name "SAFFOLA TASTY" (Marco Limited, India and obtained from local grocer)) were spread uniformly on coated and uncoated glass panels (15 drops for the wood laminate panels) and allowed to stand at 20° C. for 1 hr.

The coated and uncoated panels were then rinsed under identical flow conditions of running 20° C. tap water for 20 seconds (700 grams water used in 20 seconds). No cleaners or surfactants were used. No abrading of any kind was done.

TABLE 1

Comparative Examples

| C. Ex. | Description | Comments | Solubility in solvent and solvent ratio | Dispersion in water | Oil Removal Test |
|---|---|---|---|---|---|
| A | No polymer treatment | | NA | NA | None |
| B | HFPO-Amide-Phosphate (no PEG monomer) | Too hydrophobic | NA | NT | None; The solid polymer was diluted to 1% w/w (weight percent) with IPA and tested as such |
| C | HFPO-Amide-Quat-Silane (no PEG or phosphate monomers) | Too hydrophobic | NA | NT | None; The 50% w/w polymer in IPA was diluted to 1% w/w with water and tested as such |
| D | Terpolymer of C4A, PEG480A, and PM1 (No HFPO-Amide-containing monomer) | Too hydrophilic; C4 acrylate monomer not a substitute for HFPO-Amide-containing monomer | VS; 100/15 | C | All; However, dried polymer VS in hot water so don't expect good durability; Oil and treatment both removed in first wash |
| E | Terpolymer of C4A, PEG500MA, and PM1 (No HFPO-Amide-containing monomer) | Too hydrophilic. C4 acrylate not substitute for HFPO-Amide-containing monomer even when making more hydrophobic with PEG methacrylate monomer | VS; 100/15 | M | All; However, dried polymer VS in hot water so don't expect good durability; Oil and treatment both removed in first wash |
| F | Terpolymer of 20 g ODMA with 25 g PEG500MA and 5 g PM2 (No HFPO-Amide-containing monomer) | No HFPO-Amide-containing monomer | G; 80/15 | NT | NT |

TABLE 1-continued

| | Comparative Examples | | | | |
|---|---|---|---|---|---|
| C. Ex. | Description | Comments | Solubility in solvent and solvent ratio | Dispersion in water | Oil Removal Test |
| G | Copolymer of 22.5 g PEG500MA and 2.5 g PM2 (No HFPO-Amide-containing monomer) | No HFPO-Amide-containing monomer | G; 50/10 H$_2$O/IPA | NT | NT |
| H | Terpolymer of 20 g HFPO-Amide-MA, 25 g PEG 500MA, and 5 g AA (No phosphate) | Carboxyl-containing monomer does not substitute for phosphate-containing monomer | C; 100/20 | Sonicating did not result in dispersion | NT |
| I | Terpolymer of 10 g PM2, 20 g HFPO-Amide-MA, and 20 g PEG500MA | High phosphate-containing monomer (20% w/w) | P (lots of it); 120/20 | NT | NT |
| J | Terpolymer of 20 g C4MA, 25 g PEG500MA, and 5 g PM2 (No HFPO-Amide-containing monomer) | Too hydrophilic. C4 acrylate monomer is not substitute for HFPO-Amide-containing monomer even when making more hydrophobic with PEG methacrylate monomer | G; 120/20 | NT | NT |
| K | Quad polymer of 10 g HFPO-Amide-MA, 10 g MMA, 25 g PEG500MA, and 5 g PM2 | 4th monomer of methyl methacrylate caused gelling | G; 120/20 | NT | NT |
| L | Ex. 1 of WO 2013/031594 (24 g C6A, 3 g AA, 2.4 g PEG360MA, and 0.6 g PM2) | | C; 30/30 | SM | None |
| M | Ex. 1 of WO 2013/031594 with 24 g HFPO-Amide-MA substituted for C6A | Effect of AA | P; 30/30 | | NT |
| N | Terpolymer of 5 g PM2, 20 g HFPO-Amide-MA, and 25 g PEG526MAU | Uncapped PEG effect | P (some); 120/20 | | Some sediment |
| O | Quad polymer of 20 g HFPO-Amide-MA, 24.7 g PEG500MA, 5 g PM2, and 0.35 g TMSPMA | Effect of alkoxy silane at 0.7 w/w % | V (some sediment); 120/20 | | Viscous solution; Did not emulsify |
| P | Quad polymer of 20 g HFPO-Amide-MA, 24.15 g PEG500MA, 5 g PM2, and 0.85 g TMSPMA | Effect of alkoxy silane at 1.7 w/w % | G; 120/20 | NT | NT |

NA = not applicable
NT = not tested

TABLE 2

| Ex. | Description | Comments | Solubility in solvent | Dispersion in water | Oil Removal Test |
|---|---|---|---|---|---|
| 1 | Terpolymer "H-10" of 20 g HFPO-Amide-MA, 25 g PEG500MA, and 5 g PM1 | Amphiphilic terpolymer with right ratios of monomers (40 w/w % HFPO-Amide-MA) | H; 120/20 | M; Dried polymer NOT soluble in hot water | All; Durable after 3 oil removal test challenges |
| 2 | Terpolymer of 20 g HFPO-Amide-MA, 24.5 g PEG1100MEM, 5 g PM2, and 1% CTA | Amphiphilic terpolymer with right ratios of monomers; Higher MW PEG monomer than Ex. 1 makes more water soluble but still durable | VS; 120/20 | M; Dried polymer VS in cold water | All; Good oil repellancy on stainless steel |
| 3 | Terpolymer of 20 g HFPO-Amide-MA, 25 g PEG480A, and 5 g PM1 | Amphiphilic terpolymer with right ratios of monomers | VS; 100/15 | M; Dried polymer VS in hot water | All |
| 4 | Terpolymer of 20 g HFPO-Amide-MA, 25 g PEG500MA, and 5 g PM1 | Amphiphilic terpolymer with right ratios of monomers | C; 100/15 | M; Viscous Dried polymer not soluble in hot water | All; Good oil repellancy on stainless steel |
| 5 | Terpolymer of 20 g HFPO-Amide-MA, 27 g PEG500MA, and 4 g PM2 | Amphiphilic terpolymer with right ratios of monomers; 8% phosphate | H; 120/20 | M | All |
| 6 | Terpolymer of 20 g HFPO-Amide-MA, 25 g PEG500MA, and 5 g PM3 | Amphiphilic terpolymer with right ratios of monomers; Alternate phophonate-containing monomer replacing phosphate-containing monomer | H; 120/20 | M; Dried polymer NOT soluble in hot water | All |
| 7 | 10 g HFPO-Amide-MA, 10 g C4MA, 25 g PEG500MA, and 5 g PM2 | 4th monomer of C4MA substituting for part of HFPO-Amide-MA | VS; 100/20 | Premix foamy and milky but clear after solvent removal | All |
| 8 | Terpolymer of 25 g HFPO-Amide-MA, 20 g PEG500MA, and 5 g PM2 | Amphiphilic terpolymer with right ratios of monomers; Higher level of HFPO-Amide-MA vs Ex. 1 (50 w/w %) | SM; 100/20 | AC; Dried polymer NOT soluble in hot water. | All |
| 9 | Terpolymer of 35 g HFPO-Amide-MA, 10 g PEG500MA, and 5 g PM2 | Higher level of HFPO-Amide-containing monomer than Ex. 8 (70% w/w) | 2 layers on cooling; 100/20 | H; No bluish tinge; Sediment; Dried polymer NOT soluble in hot water | All |
| 10 | Terpolymer of 35 g HFPO-Amide-MA, 10 g PEG1100MEM, and 5 g PM2 | | 2 layers on cooling; 100/20 | H; No bluish tinge; Dried polymer NOT soluble in hot water | All |
| 11 | Terpolymer of 20 g HFPO-Amide-MA, | Sulfonate-containing | | H | All |

TABLE 2-continued

Examples

| Ex. | Description | Comments | Solubility in solvent | Dispersion in water | Oil Removal Test |
|---|---|---|---|---|---|
| | 20 g PEG500MA, and 5 g AMPS | monomer can substitute for phosphate- or phosphonate-containing monomers | | | |
| 12 | Terpolymer of 2 g PM2, 23 g HFPO-Amide-MA, and 25 g PEG526MAU | Uncapped PEG effect | P (very small amount); 120/30 | H | All |
| 13 | Terpolymer of 5 g HFPO-Amide-MA with 42.5 g PEG500MA and 5 g PM2 | Low HFPO-Amide-MA (10% w/w) | H; 120/20 | | All |
| 14 | Terpolymer of 2 g PM2, 20 g HFPO-Amide-MA, and 29 g PEG500MA | Low phosphate-containing monomer (4% w/w) | H; 120/20 | | All |

NA = not applicable
NT = not tested

Real Life Baffle Testing

Figure 1B:
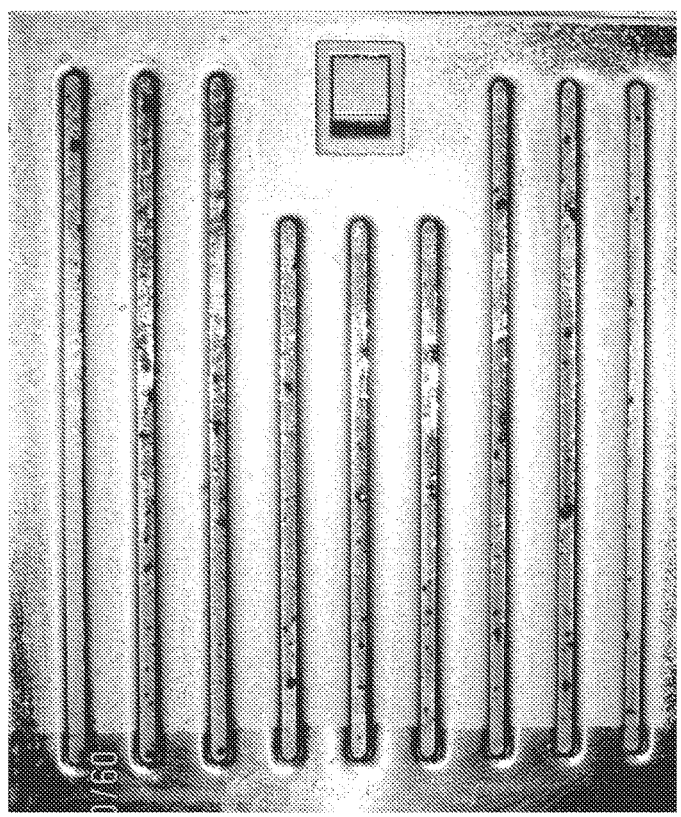

To further exemplify the effect, Example 1 polymer at 0.1% in water was spray coated on a stainless steel baffle and allowed to dry at 20° C. The coated and uncoated baffle in a vent hood (side by side) were subjected to real life cooking conditions in a home for a month, after which both baffles were removed for cleaning. FIG. 1A shows clearly that the coated baffle cleaned very easily after dipping in warm tap water (30-35° C. for 20-30 min). When the uncoated baffle was dipped in the same warm water for the same time, the oil was clearly not removed, as seen in FIG. 1B.

Additional Substrate or Soil Testing

The polymer of Example 1 was next tested against a competitive commercial hard surface cleaner additive (commercially available from Croda, Inc., Edison, N.J. under the trade name "MODISURF") that advertises it makes soils easier to remove and provides a protective surface layer against future soils. A 1% solution of MODISURF in water and 0.5% Example 1 polymer solution in water were evaluated. Both the solutions were spray coated onto steel panels and tested as per "Oil Removal Test B" but after the oil coated panels were allowed to dry for 1 hour, 0.1 g of roadside clay dirt (ground in a mortar and pestle and sieved with a 45-micron size sieve) was sprinkled uniformly on top of the oil-coated panels. Extra (loose) dust was removed by patting the panels five times from the surface. The Example 1 polymer coated panel retained 40-50% less dirt compared to "MODISURF" polymer. These were allowed to sit at ambient temperature for 24 hrs so as to give sufficient time for the oil and dust to sit on the surface.

These panels were cleaned by running them under tap water for 15-20 sec. The Example 1 polymer (vs. "MODISURF") did a much better job in cleaning the oil and dirt from the surface, as was seen in real life conditions under the vent hoods.

Figure 2C:
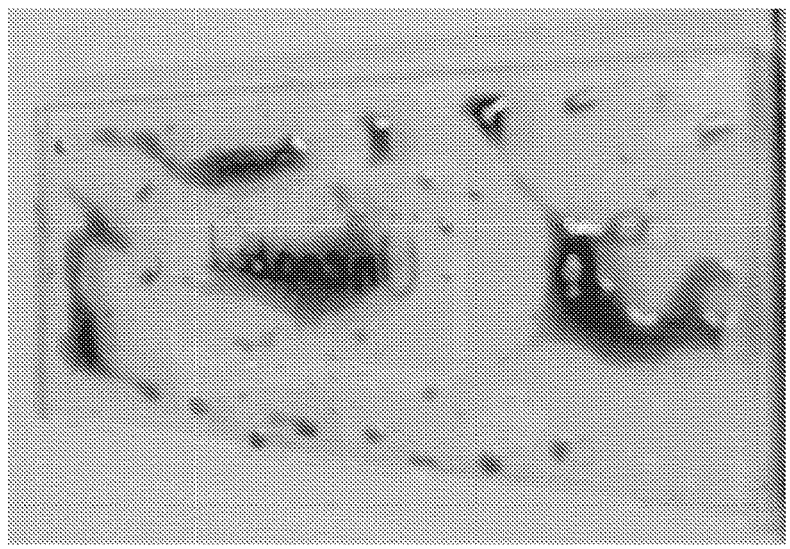
FIG. 2C is a photograph of the untreated glass surface after being cleaned.
Figure 2B:
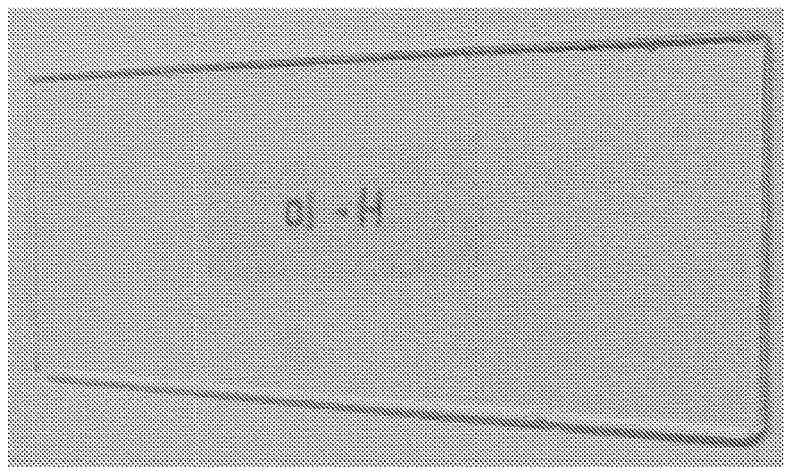
FIG. 2A and FIG. 2B are photographs of a glass surface treated with a coating composition of the present disclosure, compared to FIG. 2C, which is a photograph of an untreated glass surface. The glass surfaces shown in FIG. 2B and FIG. 2C were challenged with vegetable oil and cleaned.
Figure 2A:
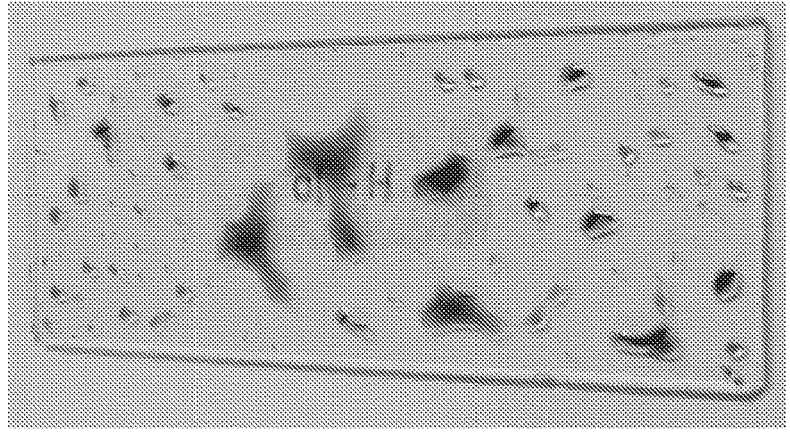
Figure 4A:
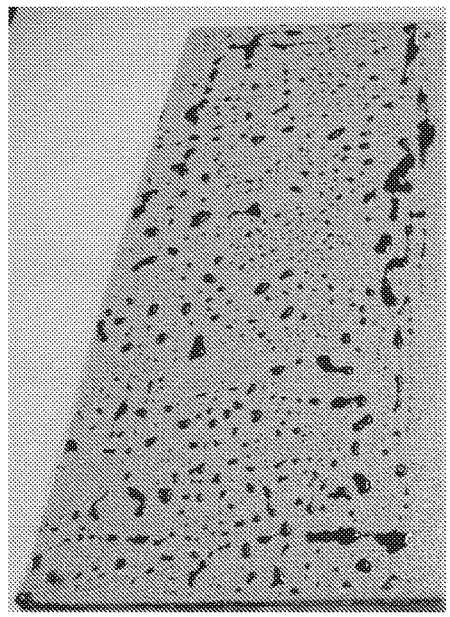
FIG. 4A/B and FIG. 5A/B are photographs of ceramic tiles treated with a coating composition of the present disclosure, compared to untreated ceramic tiles, both of which were challenged with vegetable oil.
Figure 4B:
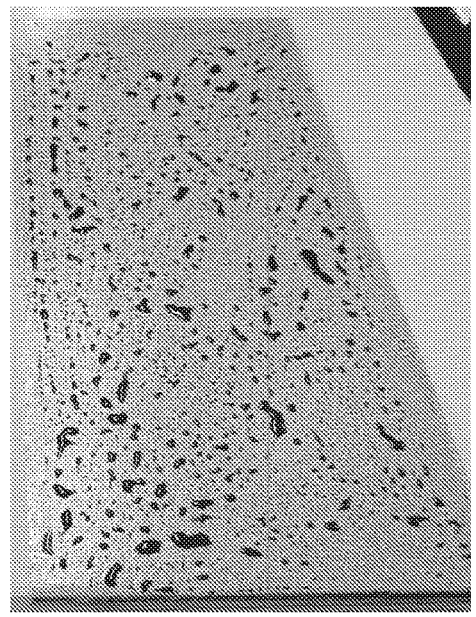
Figure 5A:
FIG. 5A and FIG. 5B show the untreated and treated tiles, respectively, after being challenged and cleaned.
Figure 5B:
Figure 6A:
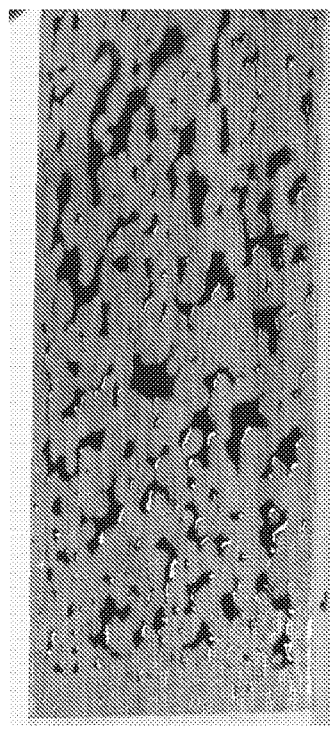
FIG. 6A/B and FIG. 7A/B are photographs of polyurethane-coated wood treated with a coating composition of the present disclosure, compared to untreated polyurethane-coated wood, both of which were challenged with vegetable oil.
Figure 7A:
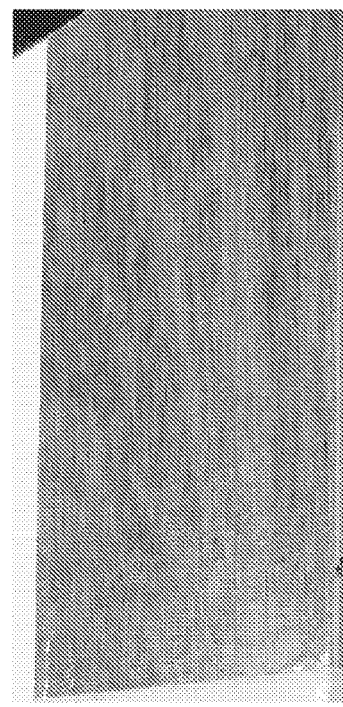
FIG. 7A and FIG. 7B show the untreated and treated wood, respectively, after being challenged and cleaned.
Figure 6B:
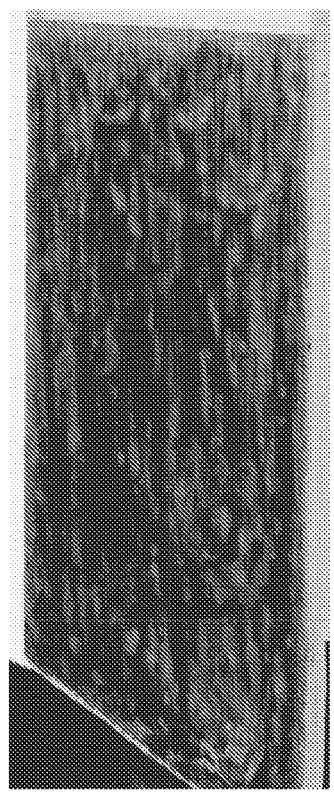
Figure 7B:
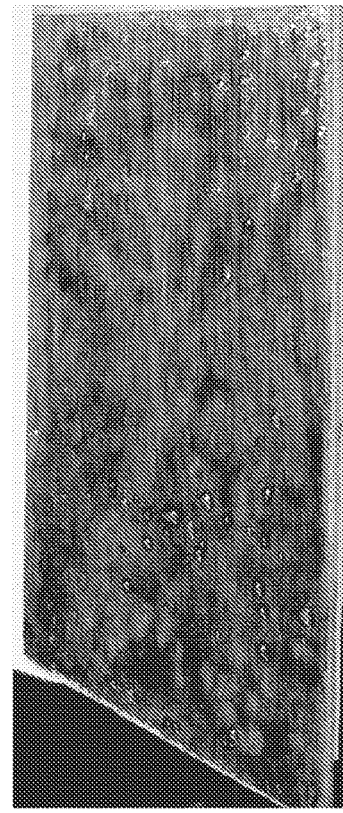

The polymer of Example 1 (0.5 wt-% in water) was next evaluated for its cleaning ability on a glass surface (FIG. 2A-2C), melamine laminated wood top sheet (FIG. 3A-3C), ceramic tile (FIG. 4A-4B, 5A-5B), and polyurethane coated wood (FIG. 6A-6B, 7A-7B). This solution was sprayed on glass panels 5 cm×10 cm (2 in×5 in) and tested as per "Oil Removal Test B." As can be seen from FIG. 2B, 3B, 5B, 7B the coated panel with Example 1 polymer showed complete removal of vegetable oil while the uncoated panel (FIG. 2C, 3C, 5A, 7A) had essentially all the oil remaining on the surface after cleaning.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. An amphiphilic polymer comprising:
   at least about 10 wt-% monomeric units comprising alkylene oxide moieties, wherein a majority of the alkylene oxide moieties are ethylene oxide moieties;
   monomeric units comprising hexafluoropropylene oxide oligomeric moieties having the formula $C_3F_7O-(CF(CF_3)CF_2O)_aCF(CF_3)-C(O)N(H)-Q-$, wherein Q is a linking group with at least one carbon atom, and "a" is at least 5; and
   monomeric units comprising pendant groups selected from phosphate groups, phosphonate groups, sulfonate groups, and combinations thereof;
   wherein the amphiphilic polymer is water dispersible.

2. The amphiphilic polymer of claim 1, wherein the pendant groups are in the acid form.

3. The amphiphilic polymer of claim 1, which forms a stable dispersion for at least one month in water at about 0.1 wt-% concentration at room temperature.

4. The amphiphilic polymer of claim 1, which includes from greater than 0 to less than 2 wt-% alkoxy silane groups.

5. The amphiphilic polymer of claim 4, which does not include alkoxy silane groups.

6. The amphiphilic polymer of claim 1, wherein the monomeric units are (meth)acrylate-containing units.

7. The amphiphilic polymer of claim 1, further comprising monomeric units comprising pendant carboxylic acid groups.

8. The amphiphilic polymer of claim 1, comprising from 10 to 80 wt-% of the monomeric units comprising alkylene oxide moieties.

9. The amphiphilic polymer of claim 1, comprising from 10 to 60 wt-% of the monomeric units comprising hexafluoropropylene oxide oligomeric moieties.

10. The amphiphilic polymer of claim 1, comprising from 1 to 10 wt-% of the monomeric units comprising pendant groups selected from phosphate groups, phosphonate groups, sulfonate groups, and combinations thereof.

11. The amphiphilic polymer of claim 1, wherein the monomeric units comprising alkylene oxide moieties which are selected from the groups consisting of free hydroxyl groups, alkyl-capped hydroxyl groups, or combinations thereof.

12. The amphiphilic polymer of claim 1, wherein "a" is up to 15.

13. An aqueous dispersion comprising the amphiphilic polymer of claim 1.

14. A method of treating a hard surface, the method comprising:
providing the aqueous dispersion of claim 13; and
applying the coating composition to the hard surface to form an easy clean coating.

15. A method of treating a hard surface, the method comprising:
providing a coating composition comprising:
water; and
the amphiphilic polymer of claim 1; and applying the coating composition to the hard surface to form an easy clean coating.

16. The method of claim 15, wherein the amphiphilic polymer of the coating composition is present in an amount of from 0.1 wt-% to 1 wt-%, based on the total weight of the coating composition.

17. The method of claim 15, wherein the coating composition further comprises one or more water-miscible organic solvents.

18. The method of claim 15, wherein the amphiphilic polymer includes from greater than 0 to less than 2 wt-% alkoxy silane groups.

19. The method of claim 15, wherein the monomeric units of the amphiphilic polymer are (meth)acrylate-containing units.

20. The method of claim 15, wherein the amphiphilic polymer comprises:
from 10 to 80 wt-% of the monomeric units comprising alkylene oxide moieties;
from 10 to 60 wt-% of the monomeric units comprising hexafluoropropylene oxide oligomeric moieties having the formula $C_3F_7O-(CF(CF_3)CF_2O)_aCF(CF_3)-C(O)N(H)-Q-$, wherein Q is a linking group with at least one carbon atom, and "a" is at least 5; and
from 1 to 10 wt-% of the monomeric units comprising pendant groups selected from phosphate groups, phosphonate groups, sulfonate groups, and combinations thereof.

* * * * *

UNITED STATES PATENT AND TRADEMARK OFFICE
CERTIFICATE OF CORRECTION

PATENT NO. : 10,093,822 B2
APPLICATION NO. : 15/502622
DATED : October 9, 2018
INVENTOR(S) : Jariwala et al.

Page 1 of 1

It is certified that error appears in the above-identified patent and that said Letters Patent is hereby corrected as shown below:

In the Specification

<u>Column 2</u>
Line 13, Delete "removed" and insert -- removed. --, therefor.

<u>Column 14</u>
Line 10, Delete "Kahjaria" and insert -- Kajaria --, therefor.

<u>Column 17</u>
Line 14 (approx.), Delete "repellancy" and insert -- repellency --, therefor.

<u>Column 17</u>
Line 27 (approx.), Delete "repellancy" and insert -- repellency --, therefor.

<u>Column 17</u>
Line 40 (approx.), Delete "phophonate-" and insert -- phosphonate- --, therefor.

Signed and Sealed this
Thirtieth Day of July, 2019

Andrei Iancu
*Director of the United States Patent and Trademark Office*